May 6, 1969

H. MIRTAIN 3,442,315

PNEUMATIC TIRES

Filed May 18, 1966

INVENTOR.
HENRI MIRTAIN
BY Norbert P. Holler
ATTORNEY 3,442,315
PNEUMATIC TIRES
Henri Mirtain, Compiegne, France, assignor to Societe Francaise du Pneu Englebert, Margny-les-Compiegne, Oise, France, a corporation of France
Filed May 18, 1966, Ser. No. 551,128
Claims priority, application France, June 1, 1965, 19,086
Int. Cl. B60c 5/00, 9/00, 11/00
U.S. Cl. 152—354                7 Claims

ABSTRACT OF THE DISCLOSURE

A pneumatic radial ply tire construction characterized by a predetermined, deliberately incorporated degree of unbalance or asymmetry to reduce frequency resonance and vibration energy transmission between such tires and a vehicle on which they are mounted. The unbalance results from the provision, in combination with the radial ply structure of the carcass, of a bias-cut carcass ply having no balancing ply with an equal and opposite cord angle associated therewith. Each tire is specified for a prescribed manner of mounting on a vehicle to ensure that when the tire is mounted for a predetermined normal direction of rotation, it will have a predetermined one of its sidewalls facing outwardly of the vehicle, and in each tire the inclination of the cord elements in the bias-cut ply, considered as extending from a bead toward the crown region of the carcass, is in the normal direction of rotation of the tire in the region of the outwardly facing sidewall and opposite to the normal direction of rotation in the region of the inwardly facing sidewall.

---

Figure 1:
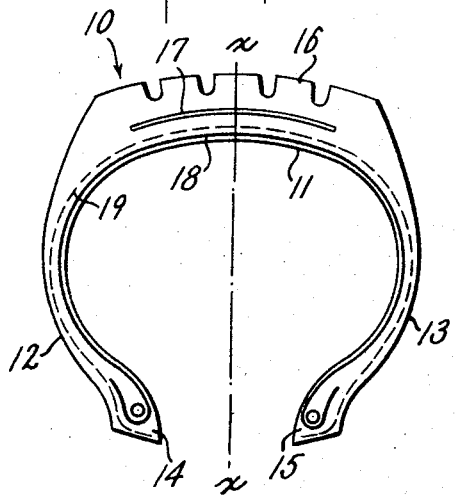

This invention relates to pneumatic tires for vehicles, and more particularly to the type of tires generally called "radial" or "radial ply" tires.

The expressions "radial tires" and "radial ply tires" as commonly used in the pneumatic tire art may be said to include various tire constructions having one or more body plies of weftless fabric extending from bead to bead wherein the respective cords in each ply are oriented substantially radially of the tire, i.e. the cords are oriented substantially normal to the beads and the crown centerline of the tire. In a monoply radial tire construction, the cords usually have a 90° bias angle, i.e. in the unshaped carcass they extend substantially perpendicular to the planes of the beads. In a two-ply radial tire construction, the cords in each body ply are usually oriented at oppositely disposed small angles of up to about 10° with respect to the perpendicular to the bead planes, and the respective body plies thus are said to have oppositely disposed bias angles of about 80° or more (but less than 90°). In a four-ply or heavier radial tire construction, similar opposed orientation of the cords in successive body plies is employed. All of these body or carcass constructions are contemplated within the scope and meaning of the term "radial" or "substantially radial" as applied to tires herein.

Those skilled in the art will also be aware of the fact that tires of this type are generally provided with a breaker or belt surrounding the crown portion of the carcass beneath the tread. Such a breaker may be either a single ply or multi-ply structure at least the radially outermost portion of which is usually composed of a tire cord fabric made of generally inextensible cord elements oriented at a relatively low bias angle to the crown centerline or median equatorial plane of the tire.

Experience has already shown that radial ply tires have a breaker beneath the tread are possessed of numerous advantages over conventional tires, such as improved cornering power, lower wear, reduced energy consumption and flexibility on smooth roads or on roads showing profile variations with relatively large wave lengths. Such tires do, however, have the disadvantage of vibrating when they are excited by obstacles with a relatively low wave length, for example when rolling over paved roads with a ripple or "washboard" surface. Such vibrations become particularly troublesome when the tires are mounted on a vehicle in which the suspension system is not adapted to the absorption of resonances corresponding to the frequencies of vibration of the radial tires, in which case the vibrations generated either in the body of the vehicle or in the motor and its accessory parts are considerable. This makes for a very uncomfortable and disagreeable ride for the driver. Also, the noises caused by the vibrations are sometimes unbearable, measurements having shown that the noise level can reach to as high as 105–110 decibels for certain types of vehicles.

Extensive research aimed at eliminating these problems by changes in the rubber stocks of which such tires are made, in the tire profiles, and in the materials of which both the breaker and the carcass are made, has brought only slight improvements.

An object of the present invention, therefore, is to provide a novel radial tire construction which will provide improved riding comfort.

A more specific object of the present invention is the provision of such a tire construction which will materially reduce and minimize the aforesaid resonances.

Generally speaking, these objectives of the present invention may be achieved by a construction of the carcass of a radial ply tire in such a manner as to either shift the vibration frequencies of the tire to either lower or higher values, or reduce the amplitudes of these vibrations. The benefit derived from the first of these approaches may be stated to be the fact that shifting the vibration frequencies of the tire is conducive to ensuring that they are out of phase with the vibrations of the vehicle. The benefit derived from the second of the foregoing approaches may be stated to be the fact that the provision of lower amplitudes, i.e. lower transmitted energies, tends to reduce the vibrations of the vehicle.

It is another and important object of the present invention, therefore, to provide a radial tire construction by means of which both of the foregoing benefits may be attained simultaneously.

To this end, a radial tire according to the present invention, including as usual a radial ply carcass, sidewalls, a tread surrounding the crown region of the carcass, and a breaker beneath the tread, is principally characterized by a deliberately created unbalance resulting from the fact that the carcass is composed of at least two plies, one of which is a substantially radial ply and the other of which is a bias-cut ply, the cord elements of which are oriented at an angle between about 5 and 45° to the meridian, i.e. a transverse or radial plane, of the tire, or alternatively at an angle between about 85 and 45° to the median equatorial plane of the tire, such bias-cut ply having no balancing ply with an equal and opposite cord angle associated therewith.

In accordance with further aspects of the present invention, one of the sidewalls of each tire, herein called the outer sidewall, is specifically assigned to face outwardly of the vehicle on which such tire will be mounted and to have a predetermined normal direction of rotation, for each tire the prescribed manner of mounting thereof on the vehicle to comply with these conditions being preferably indicated with the aid of any suitable means associated with the tire, for example a visual or tactile marking on one or more of the tread, sidewall and bead regions of the tire, and the cord angle of the bias-cut ply is positive in the outer sidewall of the tire and negative in the inner sidewall. The terms "positive" and "negative" are here being used in the sense that they would have with reference to a Cartesian system of coordinates. In the instant case, the x-axis of the system is deemed to coincide with the crown centerline of the tire, and the y-axis of the system is deemed to extend transversely to the crown centerline of the tire, the origin being at their point of intersection, the positive y-direction being from the origin toward the outer sidewall, and the positive x-direction being opposite to the normal direction of rotation of the tire. Under this definition, therefore, a positive cord angle in the outer sidewall would be an angle located in the first quadrant of such a system, and in a developed plan of the tire viewed from behind (i.e. in the direction of rotation) this would cause the cords to extend from the lower right (outer sidewall) to the upper left (inner sidewall). Stated in other words, in the outer sidewall the planes of the cords of the bias-cut ply, considered as extending from the respective bead toward the crown region of the carcass, are inclined in the normal direction of rotation of the tire, while in the inner sidewall they are inclined in the opposite direction.

In accordance with still other aspects of the present invention, the bias cut ply may be disposed either exteriorly or interiorly of the radial ply, may be either continuous, i.e. extending from bead to bead, or discontinuous, i.e. extending in two sections from the two beads upwardly along the sidewalls toward the shoulders and breaker of the tire, and preferably is made of cord elements of a material the elongation characteristics of which are different from those of the material of which the cord elements in the radial ply are made.

Figure 2:
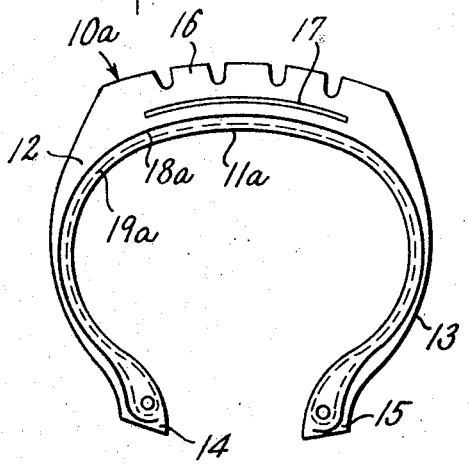
Figure 3:
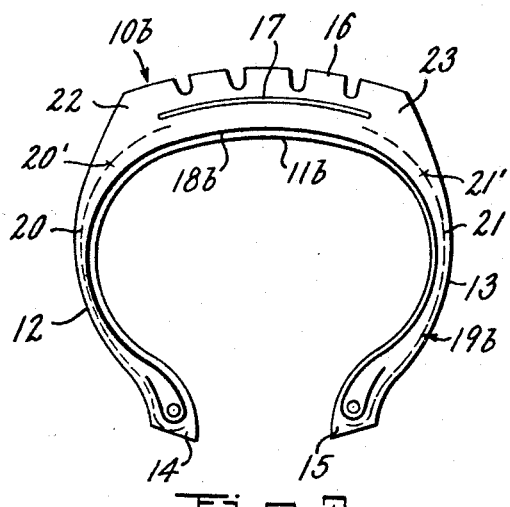
Figure 4:
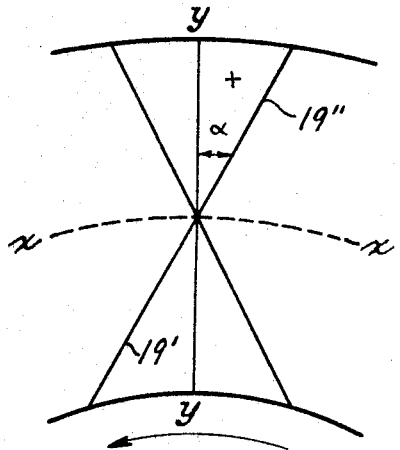

The foregoing and other objects, characteristics and advantages of the present invention will be more clearly understood from the following detailed description thereof when read in conjunction with the accompanying drawing, in which:

FIGS. 1, 2 and 3 are diagrammatic transverse or radial sections of tires constructed in accordance with the principles of the present invention; and FIG. 4 is a graphic representation of the cord angle orientation of the bias-cut ply relative to the meridian or radial plane of the tire.

Referring now to the drawing in greater detail, in the various figures of which like elements are designated by like reference numerals, the tire 10 shown in FIG. 1 comprises a carcass 11, sidewalls 12 and 13 terminating at their radially inwardmost ends in beads 14 and 15, respectively, a tread 16 surrounding the crown region of the carcass, and a breaker 17 interposed between the tread and the crown region of the carcass. The breaker, as previously described, is a tire cord fabric structure in which the cord elements (oriented at low bias angles) are generally inextensible and may be made of such materials as metallic wires, glass filaments, polyester filaments, rayon filaments, and the like.

In the tire 10 illustrated in FIG. 1, the carcass 11 is shown as comprising an inner body ply 18 of substantially radially oriented cords, and an outer body ply 19 of angularly oriented tire cords. In the tire 10a illustrated in FIG. 2, the carcass 11a differs from the carcass 11 only in that the radial ply 18a is located outwardly of the bias-cut ply 19a. In the tire 10b illustrated in FIG. 3, the carcass 11b comprises an inner substantially radial ply 18b and an outer ply 19b of bias cut cord fabric, this ply being discontinuous, however, and being composed of two ply sections 20 and 21 extending from the respective beads 14 and 15 through the sidewalls 12 and 13 toward the shoulder regions 22 and 23 of the tire. The ply sections may terminate under the opposite side edges of the breaker 17, as shown, or even further in toward the crown centerline of the tire, but it will be understood that the ply sections may terminate above the breaker as well, and also that they need not extend completely up to the breaker and could terminate somewhat short thereof, for example in the regions of the sidewall shoulders 22 and 23 at points such as are designated 20' and 21', respectively.

In each of the plies 19, 19a and 19b, the cords thereof are oriented (see FIG. 4) at an angle α to the meridian or radial plane y—y of the tire, ranging between about 5 and 45°, and as previously stated this angle is "positive" in the outer sidewall and "negative" in the inner sidewall of the tire. Thus, viewing the tire from behind (the right in FIG. 4) in its normal or forward direction of rotation (designated by the arrow), the leading or inner sidewall portion 19' of each cord element of the bias-cut ply at the top of the tire is located farther away from the viewer than the trailing or outer sidewall portion 19" of the same cord element, i.e. the planes of the cords, considered as extending from a bead toward the crown region of the tire, are inclined in the normal direction of rotation in the outer sidewall and in the opposite direction in the inner sidewall.

As a further refinement of the present invention I have found it advantageous to employ in the radial and bias-cut plies respective cord materials having different elongation characteristics. Merely by way of example, the radial ply 18 may be made with cord elements of rayon while the bias-cut ply 19 may be made with cord elements of nylon, but it will be apparent that other cord combinations of the available cord materials may be utilized advantageously, for example metallic wire cables in one ply and polyester cords in the other ply, or nylon in one ply and polyester in the other, or fiber glass in one ply and either nylon or polyester in the other, etc.

Tests have confirmed that a modified radial tire constructed in accordance with the principles of the present invention is possessed of generally lower resonance frequencies than a standard radial ply tire, that the amplitudes of the vibrations of the modified radial tire of this invention are generally lower than the vibration amplitudes in a standard radial ply tire, and that the ride in a vehicle equipped with a set of tires constructed and mounted in accordance with my invention is considerably more comfortable than the ride in that vehicle when equipped with standard radial ply tires.

It is to be understood that the foregoing description is for purposes of illustration only, and that the various aspects of the present invention disclosed herein are suscepible to a number of variations and modifications none of which involves a departure from the spirit and scope of the present invention as defined by the hereto appended claims.

Having thus described my invention, what I claim and desire to secure by Letters Patent is:

1. A pneumatic tire, comprising a carcass, two sidewalls, a tread surrounding the crown portion of said carcass, a breaker interposed between said carcass and said tread, and means associated with part of the tire for indicating the precribed manner of mounting thereof on a vehicle so as to ensure that the tire will have, when mounted, a predetermined normal direction of rotation and a predetermined one of said sidewalls facing outwardly of the vehicle, said carcass comprising a pair of plies in one of which the cord elements are oriented substantially radially of the tire, and in the other of which the cord elements are oriented at an angle between about 5° and 45° to the meridian of the tire, the inclination of the planes of the cords in said last-named ply, considered as extending from a bead toward said crown region of said carcass, being in the normal direction of rotation of the tire in the region of the sidewall facing outwardly of the vehicle and opposite to said normal direction of rotation in the region of the sidewall facing inwardly of the vehicle, and said last-named ply having no balancing ply with an equal and opposite cord angle associated therewith, whereby frequency resonance and vibration energy transmission between the tire and the vehicle are minimized.

2. A pneumatic tire according to claim 1, said last-named ply being located outwardly of the radial ply.

3. A pneumatic tire according to claim 1, said last-named ply being located inwardly of the radial ply.

4. A pneumatic tire according to claim 1, said last-named ply being interrupted along the crown region of the tire.

5. A pneumatic tire according to claim 1, the cord material of said last-nemed ply having different elongation characteristics than the cord material of the radial ply.

6. A pneumatic tire according to claim 5, said cord materials being nylon and rayon, respectively.

7. A pneumatic tire according to claim 5, said cord materials being polyester and steel, respectively.

References Cited

UNITED STATES PATENTS

| | | | |
|---|---|---|---|
| 999,157 | 7/1911 | Eckrode | 152—353 |
| 3,165,138 | 1/1965 | Manchetti | 152—354 |
| 3,231,000 | 1/1966 | Massoubre | 152—361 |
| 3,242,965 | 3/1966 | Mirtain | 152—361 |
| 2,703,128 | 3/1955 | Darrow | 152—356 |
| 2,782,830 | 2/1957 | Wallace | 152—355 |
| 3,108,628 | 10/1963 | Kraft | 152—354 |

FOREIGN PATENTS 700,790   12/1964   Canada.

ARTHUR L. LA POINT, *Primary Examiner.*

C. B. LYON, *Assistant Examiner.*

U.S. Cl. X.R.

152—356